United States Patent
Dilger

(10) Patent No.: US 6,763,293 B2
(45) Date of Patent: Jul. 13, 2004

(54) CALIBRATION PROCEDURE FOR A PERMANENTLY POWERED RELATIVE STEERING WHEEL ANGLE SENSOR WITH POWER-LOSS INDICATION

(75) Inventor: Fritz P. E. Dilger, Royal Oak, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 40 days.

(21) Appl. No.: 10/316,537

(22) Filed: Dec. 11, 2002

(65) Prior Publication Data

US 2004/0117087 A1 Jun. 17, 2004

(51) Int. Cl.⁷ .......................... B62D 5/04; G06F 19/00
(52) U.S. Cl. .................... 701/41; 180/401; 180/443; 180/446; 180/410; 180/412; 702/85; 702/93; 702/96
(58) Field of Search .............................. 701/29, 41, 49; 180/401, 443, 446, 410, 412; 702/85, 93, 96

(56) References Cited

U.S. PATENT DOCUMENTS

| | | | |
|---|---|---|---|
| 4,951,199 A * | 8/1990 | Whitehead | 701/41 |
| 5,623,409 A * | 4/1997 | Miller | 701/41 |
| 5,787,375 A | 7/1998 | Madau et al. | 701/41 |
| 5,790,966 A | 8/1998 | Madau et al. | 701/41 |
| 6,354,396 B1 * | 3/2002 | Horton et al. | 180/446 |
| 2003/0023395 A1 * | 1/2003 | O'Mahony et al. | 702/95 |
| 2003/0107321 A1 * | 6/2003 | Horiuchi | 315/77 |
| 2003/0141137 A1 * | 7/2003 | Menjak et al. | 180/402 |

* cited by examiner

Primary Examiner—Thomas G. Black
Assistant Examiner—Ronnie Mancho

(57) ABSTRACT

A method is disclosed for determining a steering wheel angle calibration reference value in a vehicle. The vehicle includes a relative steering wheel angle sensor, which is unique in that it receives power directly from the vehicle's battery and interacts with the vehicle's car area network. The vehicle also includes an active yaw controller that interacts with the vehicle's car area network. The steering wheel angle calibration reference value only needs to be updated when power to the relative steering wheel angle sensor has been interrupted.

3 Claims, 3 Drawing Sheets

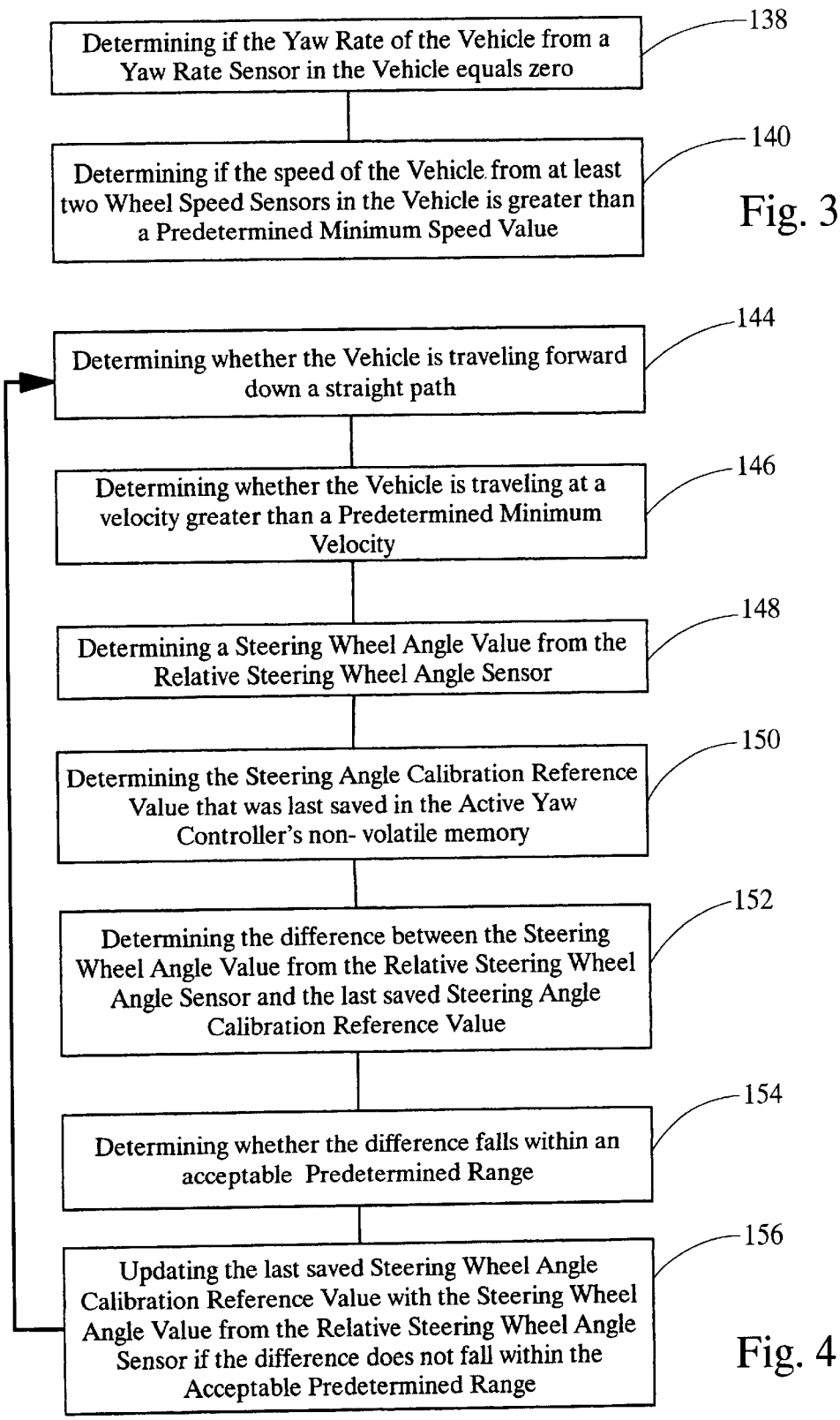

CALIBRATION PROCEDURE FOR A PERMANENTLY POWERED RELATIVE STEERING WHEEL ANGLE SENSOR WITH POWER-LOSS INDICATION

BACKGROUND OF THE INVENTION

It is known to determine the steering center of a moving vehicle. This value is important to know for several different advanced vehicle functions, for example vehicle active yaw control. Further, it is important to learn this value as early in the driving cycle as possible so that these vehicle functions may be activated in a timely manner.

One way of determining the steering center of a moving vehicle is the use of an absolute steering wheel angle sensor. An absolute steering wheel angle sensor provides the actual position of the steering wheel at any point in the vehicle's driving cycle. These sensors are rather expensive averaging approximately $30 each.

On the other hand, relative steering wheel angle sensors average approximately $5 each, making its use desirable to reduce the overall cost of the vehicle. This type of sensor does not provide the absolute position of the steering wheel. Rather, relative steering wheel angle sensors sense movements of the steering wheel only. Unfortunately, the steering center position needs to be determined in each ignition cycle in vehicle's utilizing this type of sensor. In the beginning of the ignition cycle, the saved steering wheel angle cannot be used since the steering wheel may have been turned while the vehicle was off, making the saved steering wheel angle inaccurate.

It is desirable to use the information that the relative steering wheel angle sensor yields to calculate an accurate absolute steering center value. To yield an accurate absolute steering center value, calculations need to be performed utilizing input from the relative steering wheel angle sensor and other vehicle sensors. Since these calculations are made every time the vehicle starts, and further require specified driving conditions, activation of the advanced vehicle functions can be significantly delayed. Accordingly, there exists a need to provide a low-cost steering wheel sensor that does not delay the calculation of an absolute steering wheel angle and hence activation of the advanced vehicle functions.

BRIEF SUMMARY OF THE INVENTION

The present invention overcomes the disadvantages outlined above by providing a method for determining a steering wheel angle calibration reference value of a vehicle's steering mechanism utilizing a relative steering wheel angle sensor that can interface with the vehicle's car area network ("CAN") and also receives power directly from the vehicle's battery.

The purpose of the present invention is to maintain the power supply to the steering wheel angle sensor so that the steering wheel angle value is not lost during power interruptions to the vehicle's active yaw controller. Rather, only power interruptions to the relative steering wheel angle sensor itself will require updating the steering wheel angle calibration reference value.

The relative steering wheel angle sensor is permanently powered by the vehicle's battery. If the power to the relative steering wheel angle sensor becomes interrupted, the sensor indicates this to the active yaw controller with a "discontinuity-flag" via the vehicle's car area network the next time communication to the controller is reestablished. Typically, communication to the controller will be reestablished as soon as the power supply to the sensor is resumed.

The calibration reference is stored in non-volatile memory and has to be re-determined every time the "discontinuity-flag" is received from the relative steering wheel angle sensor. The calibration reference is defined as the steering wheel angle sensor signal, which can only be determined while the vehicle is driving down a straight path.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 3 is a flowchart illustrating the method of the present invention for determining if the vehicle is traveling forward down a straight path; and FIG. 4 is a flowchart illustrating the method of the present invention for determining an updated steering wheel angle calibration reference value.

DETAILED DESCRIPTION OF THE INVENTION

Figure 1:
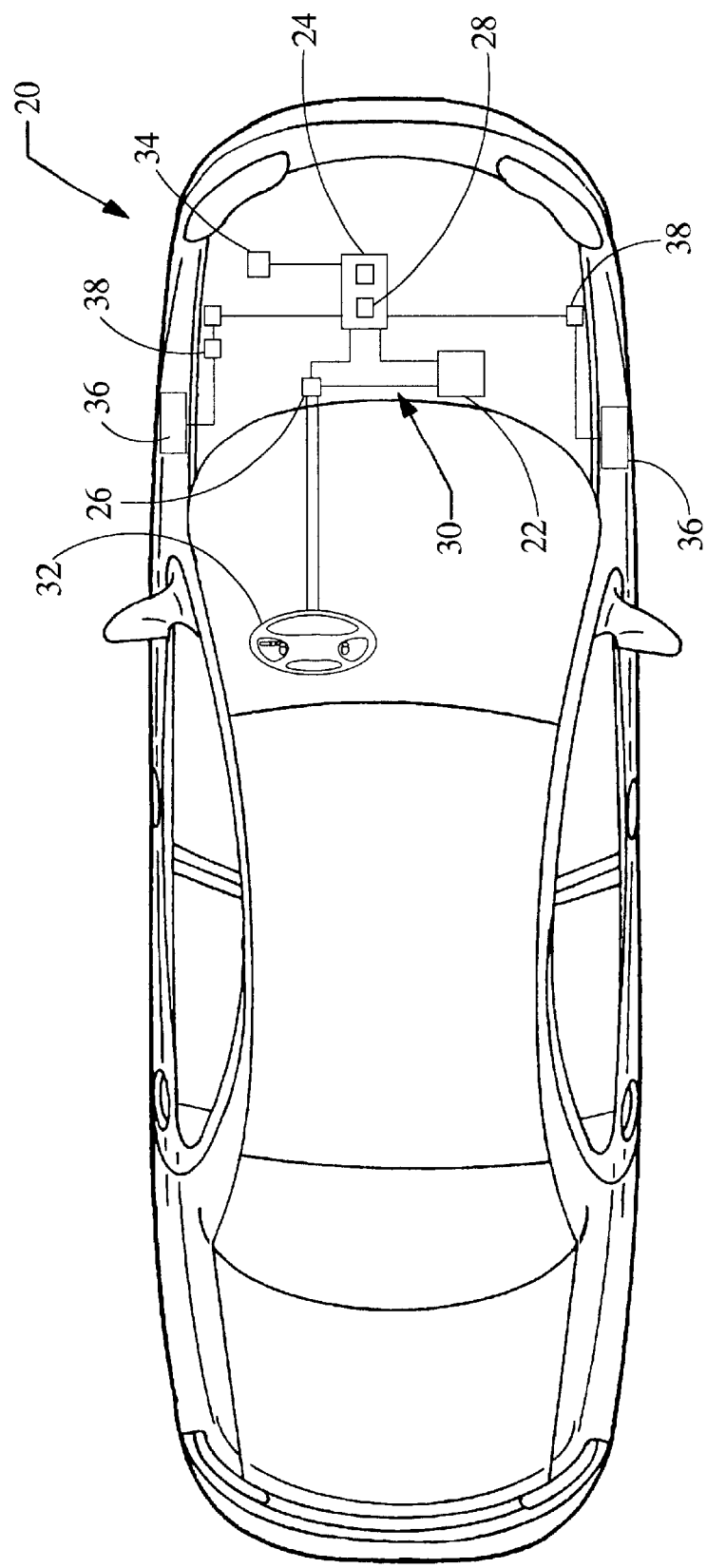
FIG. 1 illustrates a vehicle installed with the present invention.

As shown in FIG. 1, the method for determining the steering wheel angle calibration reference value of a vehicle's steering mechanism of the present invention is used on a vehicle, shown generally at 20. There are certain components and sensors that are involved in the proper functioning of the method of the present invention.

Some of the essential components in the vehicle include a battery 22, an active yaw control 24, and a relative steering wheel angle sensor 26. The battery 22 is preferably a typical battery that supplies power to vehicle accessories. The active yaw controller 24 is a controller that interacts with the vehicle's CAN, shown generally at 30, and has a non-volatile memory 28. The controller's non-volatile memory 28 will not lose any stored information if power to the controller 24 is interrupted.

The relative steering wheel angle sensor 26 required for the present invention is directly powered by the vehicle's battery 22 and interacts with the vehicle's CAN 30. Further, the relative steering wheel angle sensor 26 senses movements of the steering wheel 32 only. It does not provide the absolute position of the steering wheel 32.

Figure 2:
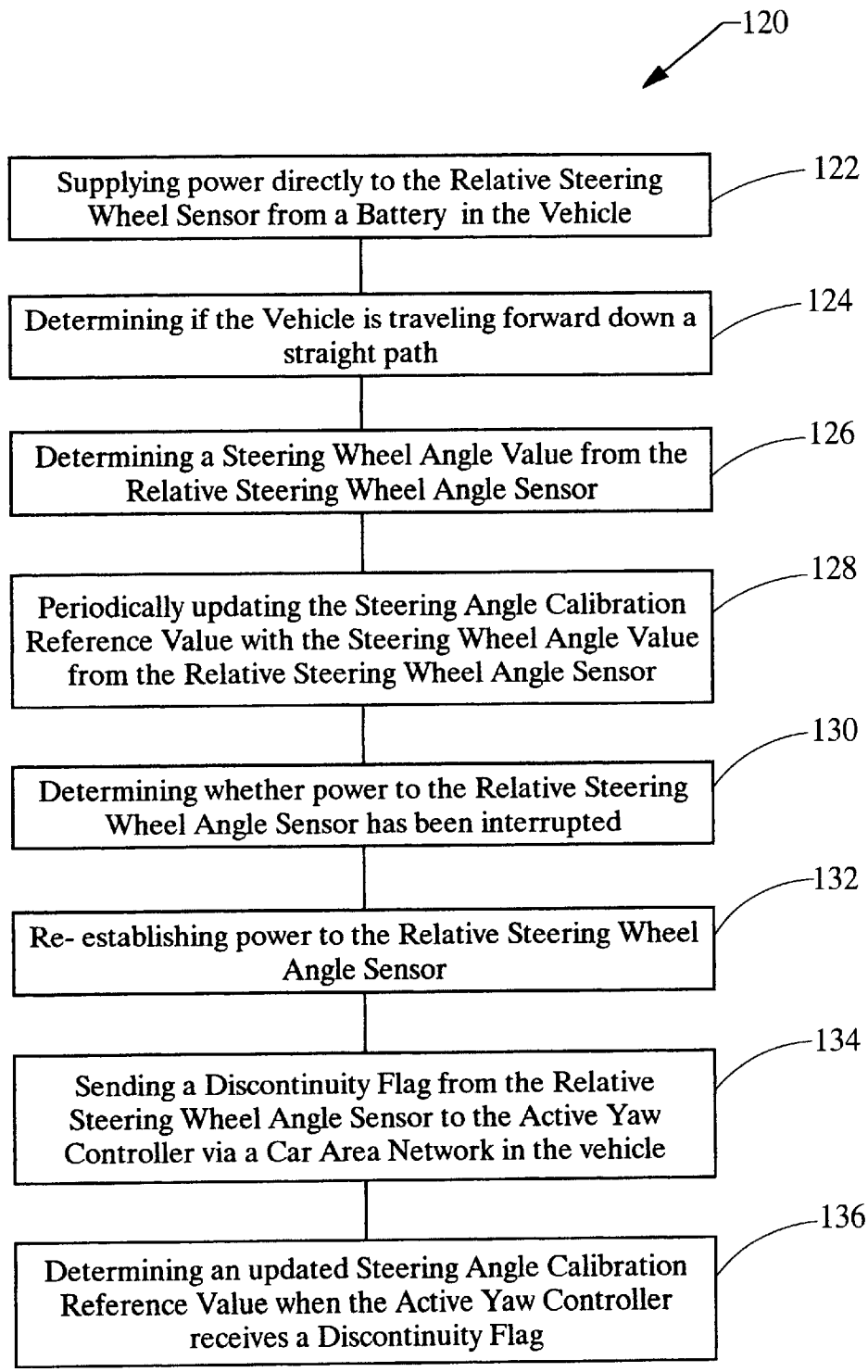
FIG. 2 is a flowchart illustrating the method of the present invention for determining a steering wheel angle calibration reference value.

The method of the present invention is shown generally at 120 in FIG. 2. Power is supplied directly to the relative steering wheel angle sensor 26 from the vehicle's battery 22, shown at 122. Next, a determination is made whether the vehicle 20 is traveling forward down a straight path, at 124.

As shown in FIG. 3, to determine whether the vehicle 20 is traveling forward down a straight path the method first involves determining of the yaw rate of the vehicle 20 equals zero or approximately zero, shown at 138. The yaw rate is determined from a yaw rate sensor 34 located in the vehicle 20. Second, the speed of the vehicle 20 is evaluated to determine if it is greater than a predetermined minimum speed value, shown at 140. The speed of the vehicle 20 is determined by detecting wheel 36 speeds from at least two wheel speed sensors 38 located in the vehicle 20. If both of these conditions are satisfied, the yaw rate is equal to zero and the speed of the vehicle 20 is greater than a predetermined minimum value, then the vehicle 20 is traveling forward down as straight path.

Once it has been determined that the vehicle 20 is traveling forward down a straight path a steering wheel angle value from the relative steering wheel angle sensor 26 is determined, shown at 126 in FIG. 2. Periodically, the steering wheel angle calibration reference value is updated with the steering wheel angle value from the relative steering wheel angle sensor 26, as shown at 128.

A determination is made when the power supply to the relative steering wheel angle sensor 26 has been interrupted, shown at 130. When power to the relative steering wheel angle sensor 26 has been reestablished, at 132, the sensor 26 sends a discontinuity flag to the active yaw controller 24 via the vehicle's CAN 30, at 134. Once the active yaw controller 24 receives the discontinuity flag, the steering wheel angle calibration reference value will be updated, at 136.

Determining the updated steering wheel angle calibration reference value includes several steps, as shown generally at 142 in FIG. 4. Again, a determination needs to be made whether the vehicle is traveling forward down a straight path, at 144. This involves determining that the yaw rate of the vehicle is zero or approximately zero based on the value detected by the yaw rate sensor 34. The velocity of the vehicle 20 needs to be evaluated to determine if is greater than a predetermined minimum velocity value, as shown at 146.

Both the current steering wheel angle value from the relative steering wheel angle sensor 26 and the steering wheel angle calibration reference value that was last saved in the active yaw controller's non-volatile memory 28 prior to the power interruption are determined, at 148 and 150. The difference between these two values is determined, at 152. Next, a determination is made whether the difference falls within an acceptable predetermined range, at 154. If the difference does fall outside of an acceptable predetermined range, then the last saved steering wheel angle calibration reference value is replaced with the current steering wheel angle value from the relative steering wheel angle sensor, at 156.

While the above description constitutes the preferred embodiment of the present invention, it will be appreciated that the invention is susceptible to modification, variation and change without departing from the proper scope and fair meaning of the accompanying claims.

What is claimed is:

1. A method for determining a steering wheel angle calibration reference value of a vehicle's steering mechanism wherein the vehicle includes a battery, an active yaw controller that saves the steering wheel angle calibration reference value, and a relative steering wheel angle sensor, wherein both the active yaw controller and the relative steering wheel angle sensor interact directly with the vehicle's car area network, the method comprising the steps of:

supplying power directly to the relative steering wheel angle sensor from a battery in the vehicle;

determining if the vehicle is traveling forward down a straight path;

determining a steering wheel angle value from the relative steering wheel angle sensor;

periodically updating the steering wheel angle calibration reference value with the steering wheel angle value from the relative steering wheel angle sensor;

determining whether power to the relative steering wheel angle sensor has been interrupted;

re-establishing power to the relative steering wheel angle sensor;

sending a discontinuity flag from the relative steering wheel angle sensor to the active yaw controller via a car area network in the vehicle; and determining an updated steering wheel angle calibration reference value when the active yaw controller receives a discontinuity flag.

2. The method of claim 1 wherein determining if the vehicle is traveling forward down a straight path further comprises the steps of:

determining if the yaw rate of the vehicle from a yaw rate sensor in the vehicle equals zero; and determining if the speed of the vehicle from at least two wheel speed sensors in the vehicle is greater than a predetermined minimum speed value.

3. The method of claim 1 wherein determining an updated steering wheel angle calibration reference value further comprises the steps of:

determining whether the vehicle is traveling forward down a straight path;

determining whether the vehicle is traveling at a velocity greater than a predetermined minimum velocity value;

determining a steering wheel angle value from the relative steering wheel angle sensor;

determining the steering wheel angle calibration reference value that was last saved in the active yaw controller's non-volatile memory;

determining the difference between the steering wheel angle value from the relative steering wheel angle sensor and the last saved steering wheel angle calibration reference value;

determining whether the difference falls within an acceptable predetermined range; and updating the last saved steering wheel angle calibration reference value with the steering wheel angle value from the relative steering wheel angle sensor if the difference does not fall within the acceptable predetermined range.

* * * * *